United States Patent Office 2,893,289
Patented July 7, 1959

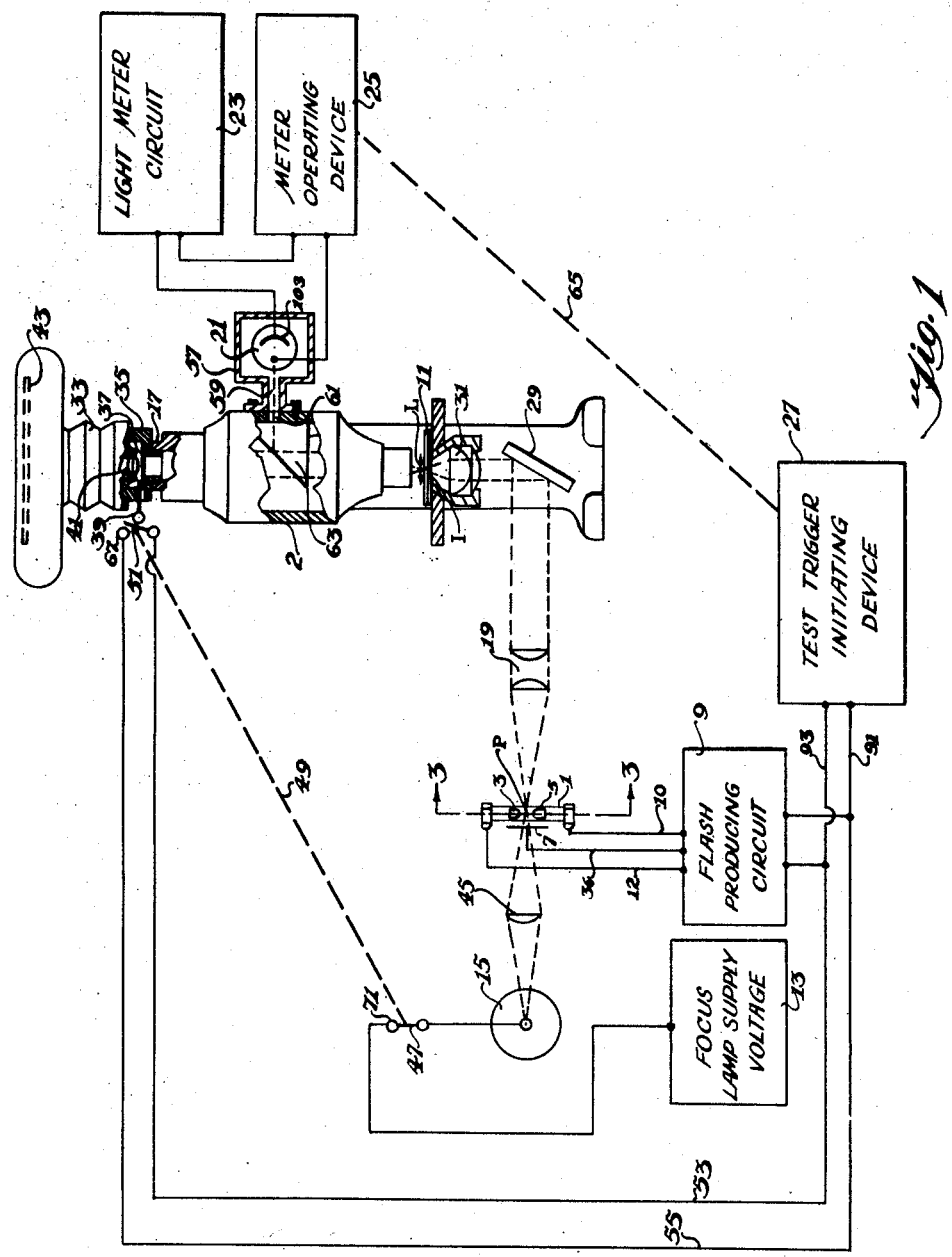

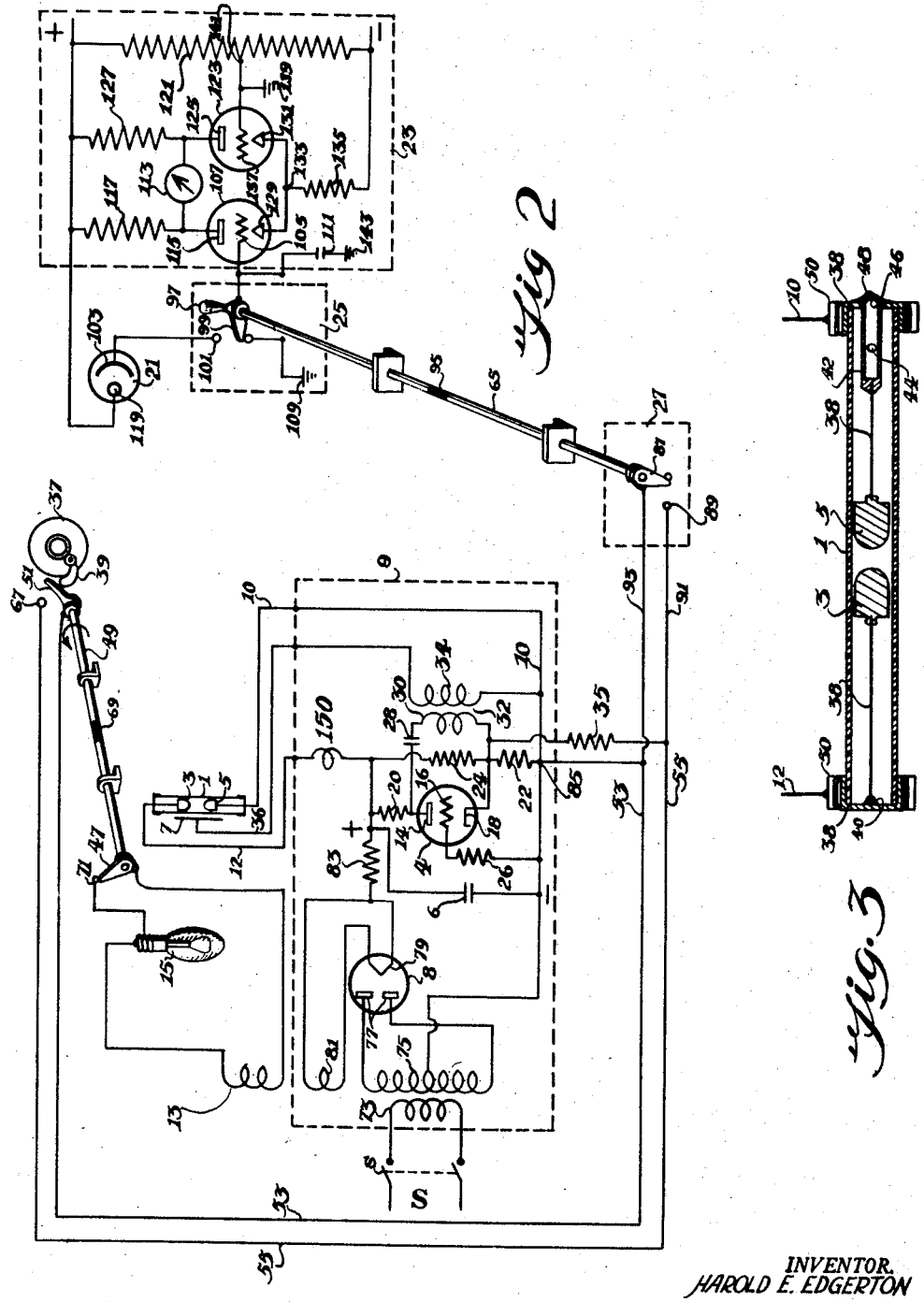

2,893,289

MICROSCOPE FLASH-PHOTOGRAPHY SYSTEM AND APPARATUS

Harold E. Edgerton, Belmont, Mass.

Application March 9, 1953, Serial No. 341,181

2 Claims. (Cl. 88—40)

The present invention relates to flash-photography systems and apparatus, and more particularly to flash-photography systems and apparatus adapted for use with microscopes in order to enable the flash-photographing of microscopic objects.

An object of the invention is to provide a novel microscope-flash-photography system.

A further object is to provide a new and improved flashtube apparatus that is particularly adapted for use in microscope flash-photography.

Other and further objects will be explained hereinafter and will be more particularly pointed out in the appended claims.

The invention will now be described in connection with the accompanying drawing, Fig. 1 of which is a schematic diagram of a microscope flash-photography system embodying the present invention;

Fig. 2 is a circuit diagram illustrating preferred electric circuits for use in the system of Fig. 1; and Fig. 3 is a sectional view, taken upon the line 3—3 of Fig. 1, looking in the direction of the arrows, of a preferred flashtube particularly adapted for use in the system of Figs. 1 and 2.

In order to take satisfactory flash photographs of microscopic specimen objects, the microscope image region containing the objects should be illuminated through the microscope sub-stage condenser by a flash of light having a very high intensity per unit area and substantially uniformly distributed over the complete image region. If the light produced by a flashtube illuminates a region greater than the image region of the microscope, then all of the light energy of the flash is not available for illuminating the image region. Were conventional flash tubes employed to illuminate the microscope image region, therefore, only that very small portion of the light produced thereby which passes through the microscope image area would be utilized. While such flashtubes do produce a large number of light-energy units per flash, moveover, the number of light-energy units per unit area is relatively small, rendering them incapable of providing the required high illumination intensity per unit area necessary, for example, to take satisfactory flash color-photographs of a microscope image region. If, on the other hand, a very small flashtube is utilized, the complete image region may not be illuminated and the small-dimensioned tube, furthermore, suffers violent heating and other effects that limits its usefulness. It has been found, accordingly, that flashtubes of a particular construction are required to enable successful microscope flash-photography.

Referring to Fig. 1, a three electrode flashtube is illustrated comprising a pair of principal electrodes 3 and 5 disposed within a light transparent tubular envelope 1 and provided with a triggering electrode 7, shown in the form of an external band. In accordance with the present invention, for reasons later explained, the separation between the principal electrodes 3 and 5 is made to correspond substantially to the linear width L of the image region I of a specimen 11 that may be visible in the ocular region 17 of a microscope 2. It is preferable that the cross-sectional area enclosed within the envelope 1 between the electrodes 3 and 5, indeed, correspond substantially to the area of the said image region I that would be visible at the ocular region 17.

The light produced by triggering an electric discharge in the space between the principal electrodes 3 and 5 through the flashtube 1, in response to triggering impulses supplied to the band electrode 7 from a flash-producing circuit 9, is collimated by a lens system 19 into a parallel beam that may be directed by a mirror 29 at the base of the microscope 2 upward through sub-stage condenser lenses 31, through the image region I of the specimen 11, and thence through the body of the microscope to the ocular region 17. In place of the conventional eye piece at the ocular region 17, of course, a photographic camera 33 is mounted, as by means of a collar insert 35. A normally closed shutter 37 having an external tripping mechanism 39, prevents light passing through the microscope from being focused by the camera lens system 41 upon the camera film 43. While the particular bellows-type camera 33 is illustrated, this is only for purposes of illustration, it being understood that other types of cameras and light-recording devices may equally well be substituted therefor. Where, indeed, repetitive light flashes are to be produced, a motion picture camera may be substituted for the camera 33, synchronization between a flash-producing circuit 9 and the operation of the motion picture camera being provided, for example, in the manner set forth in United States Letters Patent 2,186,013, issued January 9, 1940, to Harold E. Edgerton.

It is not, of course, possible to set up and properly focus the system 2—33 with the naked eye because the flash produced by the flashtube 1 is too brief to permit visual observation and adjustment. It is necessary, therefore, to provide the conventional source of microscope continuous illumination, such as the lamp 15, to enable such focusing and other adjustments. Since, however, the focusing and other adjustments must also be appropriate for the light produced by the flashtube 1, it is necessary that the light from the lamp 15 appear to emanate from the same point or region as the light produced by the flashtube 1, as discussed, for example, in United States Letters Patent 2,277,697 and 2,277,698, issued March 31, 1942, to Herbert E. Grier and Kenneth J. Germeshausen, respectively. To this end, the continuous light from the focus lamp 15 is focused by a lens 45 upon a point P within the tube 1 substantially midway between the principal electrodes 3 and 5. It is to be understood that the band electrode 7 is not directly interposed between the lamp 15 and the flashtube 1, as shown, but is placed to the side of the flashtube envelope so that light may be focused within the flashtube 1 from the lamp 15. The dimensions of the image of the filament of the lamp 15 cast upon the flashtube 1 is caused to be approximately the same as the dimensions of the flashtube 1 between its principal electrodes in order that the continuous light from the lamp 15 may illuminate the subject image region I over substantially the same area as the illumination from the flashtube 1. Focusing and other adjustments of the system with the conventional focus lamp 15 can therefore be achieved in the knowledge that the system is correctly focused and adjusted for the light from the flashtube 1, as well.

When it comes time to take a flash photograph, however, the focus lamp 15 must be extinguished. This result may be obtained by synchronizing the movement of the shutter 37, exposing the film 43, with the movement of a mechanism 47, shown as a normally closed switch, for de-energizing the lamp 15. This synchronization is schematically illustrated in Fig. 1 as effected by a dotted ganged connection 49 between the switch mechanism 47 controlling the feeding of voltage to the lamp 15 from the focus-lamp-supplying voltage source 13, and a switch mechanism 51 that is operated by movement of an external tripping device 39 of the camera shutter 37. The closing of the switching device 51 operates the flash-producing circuit 9 through conductors 53 and 55 to thereupon produce a triggering impulse that may effect an electrical discharge in the flashtube 1 between the principal electrodes 3 and 5. The flash of light resulting from this discharge, therefore, occurs when the shutter 37 is open, and the desired flash-photographic exposure is impressed upon the film 43.

The above discussion has proceeded upon the assumption that one is sure that the amount of energy produced by the flashtube 1 is proper for the particular specimen 11 to be photographed. In practice, however, it is desirable that one check that such is the case prior to taking the photograph. In accordance with the present invention, this checking is accomplished with the aid of a test circuit comprising a normally ineffective photo-electric-cell-controlled light meter 21—23—25. This meter may comprise a photo-electric cell or other light-responsive device 21 connected to a light-meter electric circuit 23 that may be operated by a meter-operating device 25. The photo-sensitive device 21 is shown disposed within a light-tight container 57 provided with an opening 59. The container 57 may be secured, as by screws, to the side of the microscope 2, with the opening 59 in alignment with a further opening 61 in the side of the microscope, through which a predetermined portion of the light passing upward through the microscope may be directed by a prism 63. At least a predetermined portion of the light passing through the specimen 11, therefore, may be caused to impinge upon the photo-sensitive device 21 and its intensity may be measured in the meter circuit 23. Preliminary to opening the shutter 37, the flashtube 1 may be caused to produce a test flash of light by operating the meter-operating device 25 synchronously with the operation of a test-trigger-initiating device 27 for triggering the flash-producing circuit 9. This synchronization is schematically illustrated in Fig. 1 by the dotted ganged connection 65 between the meter-operating device 25 and the test-trigger-initiating device 27. The light-meter circuit is preferably of the integrating type described in United States Letters Patent 2,588,368 issued March 11, 1952, to the said Harold E. Edgerton. In this manner, therefore, an indication may be obtained in the light meter circuit 23 as to the adequacy of the flash of light produced by the flashtube 1 for producing a desired exposure of a particular specimen 11. If too little energy, for example, is produced in the light flash, an increase in the supply voltage of the flash-producing circuit may be effected to produce a flash of the necessary intensity. Other well-known adjustments may also be effected.

In Fig. 2, a preferred circuit is illustrated for achieving these results. The switch 51 is shown in the open position, operable to a closed position to make contact with a terminal 67, thereby to provide a connection through the switch 51 between conductors 53 and 55. As will later be explained, this connection between the conductors 53 and 55 may trigger a gaseous-discharge tube 4, forming part of the flash-producing circuit 9, thereby to initiate the production of a flash of light in the flashtube 1. The ganged connection 49 between the switch 51 and the normally closed focus-lamp switch 47 may, for example, assume the form of a shaft 49 provided with an intermediate insulator 69. When the shaft 49 is rotated counter-clockwise, in the direction of the arrow, in response to the upward movement of the shutter-tripping mechanism 39, the switch 47 is disconnected from the terminal 71, opening the circuit from the transformer secondary winding 13 that supplies voltage to the focus lamp 15. The secondary transformer winding 13, in turn, may be energized from a primary transformer winding 73 that may be connected to the conventional alternating-current mains upon the closing of the switch S.

The energy for the discharge between the principal electrodes 3 and 5 of the flashtube 1 is provided by a storage capacitor 6 that may be charged through the full-wave rectifier tube 8, the anodes 77 of which are connected to opposite terminals of a step-up secondary transformer winding 75 cooperating with the primary transformer winding 73. The cathode 79 of the full-wave rectifier tube 8 is heated through still a further secondary transformer winding 81 and is connected through a charging resistor 83 to one side, shown as the upper + terminal, of the capacitor 6. The lower or — terminal of the capacitor 6 is connected to an intermediate point of the secondary transformer winding 75. This — terminal is also connected by conductor 10 to the principal electrode 5 of the flashtube 1. The + terminal of the capacitor 6 is connected by the conductor 12 to the principal electrode 3 of the flashtube 1. There is thus applied between the principal electrodes 3 and 5, the voltage of the charged storage capacitor 6. The voltage of the capacitor 6 is not sufficiently great, however, normally to effect a discharge between the electrodes 3 and 5 until a trigger-initiating stimulus is supplied between, for example, the external electrode 7 and the principal electrode 5. The before-mentioned gaseous-discharge tube 4, having an anode 14, a control electrode 16 and a cathode 18 is provided for the purpose of producing this initiating stimulus. The anode 14 is connected through a resistor 20 to the + terminal of the capacitor 6. The cathode 18 is connected to the — terminal of the capacitor 6 through a resistor 22 that forms part of a bleeder network 22, 24 connected between the + and — terminals of the capacitor 6. The control electrode 16 is connected through a bias sistor 26 to the — terminal of the capacitor 6. The tube 4 is thus normally non-conductive and therefore normally ineffective to trigger the flashtube 1. Upon the closing of the switch 51, however, as before described, the conductor 53, which is connected to the — terminal of the capacitor 6 at 85, becomes connected to the conductor 55. Since the conductor 55 is connected through a further resistor 35 to the cathode 18 of the trigger tube 4, the resistor 35 is thus placed in parallel with the bleeder resistor 22, reducing the bias voltage applied to the cathode 18 by the bleeder network 22, 24 and thereupon permitting the trigger tube 4 to conduct. Prior to such conduction, however, a further capacitor 28 may be charged from the + terminal through the resistor 20 and a primary winding 30 of a trigger transformer 32, and thence through the resistor 22 to the — terminal. Promptly upon the conduction of the trigger tube 4, accordingly, the charged capacitor 28 will discharge through the primary winding 30 between the cathode 18 and the anode 14 of the tube 4, producing a sharp voltage impulse that may be stepped up in a secondary transformer winding 34 of the trigger transformer 32. The resulting trigger pulse produced in the secondary transformer winding 34 is fed by conductors 10 and 36 between the principal electrode 5 and the trigger electrode 7 of the flashtube 1, initiating the discharge of the storage capacitor 6 between the principal electrodes 3 and 5, and producing the desired flash of light in the flashtube 1.

The intensity of this flash, as before-stated, may be controlled, for instance, by regulating the voltage upon the storage capacitor 6 in any well-known way, and the duration of the flash may be controlled by varying the impedance in the discharge circuit traceable from the + and — terminals of capacitor 6 along conductors 10 and 12 between the principal electrodes 3 and 5, as is also well known.

In like manner, the test-trigger initiating device 27 may cause the triggering of the tube 4 and a production of a test flash of light in the flashtube 1. This test-trigger-initiating device 27 may comprise a normally open switch 87, that when closed to engage a terminal 89, provides a short circuit between conductors 53 and 55 by way of auxiliary conductors 91 and 93. The ganged connection 65 between the test-trigger device 27 and the light-meter-operating-device 25, above mentioned, may also assume the form of a shaft 65 provided with an intermediate insulator 95. The closing of the switch 87, as by moving the handle 97 attached to shaft 65, may cause a further switch 99 to engage a terminal 101 in the meter-operating device 25. The engagement of the switch 99 with the terminal 101 connects the cathode 103 of the photo-sensitive cell 21 to the control electrode 105 of a vacuum or electron tube 107 in the light meter circuit 23. The anode 115 of the tube 107 is connected through a plate resistor 117 to the anode 119 of the photoelectric cell 21, and also to the positive terminal + of a voltage-supply bleeder potentiometer 121. The tube 107 is connected in parallel with a similar tube 123. The anode 125 of the tube 123 connects with the + terminal of the potentiometer 121 through a plate resistor 127 corresponding to the plate resistor 117 associated with the tube 107. The cathodes 129 and 131 of the respective tubes 107 and 123 are connected together at 133 and through a common cathode resistor 135 to the — terminal of the potentiometer 121. Connected between the anodes 115 and 125 of the tubes 107 and 123 is a meter or other indicator 113.

With the meter-operating switch 99 in the open position shown, the control electrode 105 of the tube 107 is grounded at 109, and the control electrode 137 of the tube 123 is also grounded at 139. The cathodes 129 and 131 of the tubes 107 and 123, however, are maintained at a potential negative with respect to ground since the ground connection 139 is effected at an intermediate tap position 141 upon the potentiometer 121. This position 141 is adjusted so that the resulting normal currents flowing in the tubes 107 and 123 are balanced and preferably exactly equal and cancel each other in the meter 113. When, however, the photoelectric cell 21 is connected to the control electrode 105 of the tube 107, as before stated, light falling upon the photoelectric cell 21, as from the test flash of light produced in the flashtube 1, will cause an integrating condenser 111 to become charged. The charging circuit is traceable from the + terminal of the potentiometer 121, through the light-energized photoelectric cell 21 through terminal 101 and switch 99, the condenser 111 and ground 143, through ground to the ground connection 139, and through the tap position 141 of the potentiometer 121 back to its + terminal. Since the upper terminal of the integrating condenser 111 is also connected to the control electrode 105 of the tube 107, the tube 107 will be caused to vary its current in accordance with the light produced by the flashtube as manifested by an integrated voltage upon the condenser 111. The current in the tube 107 will therefore no longer balance the current in the tube 123 and a resultant indication will be provided in the meter 113 representative of the intensity of the light flash impinged upon the photoelectric cell 21. Other types of light-meter circuits can, of course, also be employed, as discussed in the said Letters Patent 2,588,368.

The closing of the switch 87 of the test trigger initiating device 27, therefore, not only effects the test triggering of the flashtube 1, but also synchronously renders the light meter assembly 21—23—25 operative to measure the intensity of the test light flash produced in the flashtube 1. If there is sufficient intensity for photographing a particular microscopic specimen 11, then the shutter-tripping mechanism 39 may be operated to produce the desired flash photograph. If, on the other hand, changes in the light-flash intensity are indicated, these may be effected, as before described, prior to taking the photograph.

While it has before been stated that the flashtube should preferably have a cross-sectional area between its principal electrodes 3 and 5 that corresponds to the small area of the image region I of the microscope, it remains to explain the preferred constructional details that permit such a small tube to operate over prolonged periods of time without failure. The flashtube envelope 1 is preferably of a high-temperature transparent material such as vycor-type quartz. The diameter of the envelope, as more clearly shown in Fig. 3, is relatively small, confining the discharge between the principal electrodes 3 and 5 and preventing dissipation of the discharged energy throughout the tube, as occurs with present-day tubes of wider diameters. The inner diameter of the tube is preferably just slightly greater than about one-eighth of an inch. The electrodes 3 and 5 are placed close together and their diameter or cross-dimension is almost the same as the inner diameter of the envelope 1. This construction prevents the expansion of the heated gas within the envelope 1 into the two ends of the tube when the flash-discharge occurs. As before-discussed, it is essential that a very great light energy per unit area be produced for these purposes, so that such expansion and dissipation of energy can not be tolerated. With the above-described construction, the gas in the flashtube 1 remains in the space between the electrodes 3 and 5 for the greater part of the time of the discharge, thereby insuring the desired high-energy, small-volume discharge. It has been found that the pressure of the gas within the envelope should preferably be high, say from about two to about ten atmospheres, in order to achieve these results. The tube, moreover, must operate with relatively low voltage from the capacitor 6, since if high voltage is used, the tube will rapidly disintegrate due to the excessive instantaneous pressure set up by the rapid discharge through the tube. It has been found that voltages of the order of 400 or 500 volts are satisfactory, and that in some cases it is advisable to use series inductance 150 in the discharge circuit to prevent too rapid a current rise that may fracture the tube. It has been found, moreover, that sintered electrodes will disintegrate when so utilized, and that the electrodes 3 and 5 should therefore preferably be of pure tungsten. This same difficulty of disintegration has also been found to occur when the electrodes are not of smooth end contour, so that the electrodes are preferably rounded at the ends, as illustrated.

During use, some material from the electrodes will sputter or erode upon the walls of the quartz-tube envelope 1. It has been determined, however, that, with the type of tube construction and operation previously described, such erosion of the electrode material fortunately does not occur upon the walls of the tube envelope in the space between the electrodes 3 and 5, but rather on those portions of the envelope walls adjacent the longitudinal sides of the electrodes 3 and 5. This is a very desirable result since the sputtered material is light-constricting. Its deposit on the portions of the walls of the tube on either side of the region between the electrodes 3 and 5, however, causes no difficulty in the use of the tube to produce the desired area of high illumination.

As an illustration, successful color photographs have been obtained with the apparatus above-described, utilizing a microscope 2 having a magnification of about 700, a flash-producing circuit 9 including a capacitor 6 of 180 microfarads charged to 450 volts for providing electrical energy between the principal electrodes 3 and 5, and a flashtube 1 preferably containing xenon gas and in which the cross-dimension and separation of the electrodes 3 and 5 are substantially the same, namely of the order of about one-eighth of an inch. Fashtubes may, however, be operated with electrode separation and electrode thickness somewhat less than and somewhat greater than about one-eighth of an inch, though the smaller the dimension, the lower voltage that can be utilized, and the larger the dimension, the less light intensity per unit area. With the separation between electrodes 3 and 5 substantially the same as the diameter or cross-dimension of the electrode, a substantially square cross-sectional area of light is produced. As above indicated, this area is preferably about one-eighth of an inch on the side and corresponds substantially to the area of microscopic sub-stage image regions.

For convenience, the ends of the flashtube envelope 1 may be provided with metal end caps 36, Fig. 3, which may be soldered to the envelope 1. The electrodes 3 and 5 may be supported by narrow wire rods 38. The left-hand rod 38 is shown soldered to the left-hand end clasp 36 at 40. The right-hand rod 38 may be held in place by a hollow metal tube 42 passed through the right-hand end cap 36 and provided with an intermediate opening 44. The flashtube 1 may be pressurized by connecting the right-hand end 46 of the hollow tube 44 to a vacuum system prior to solder-sealing the same at 48. The conductors 12 and 10 may be connected to the flashtube by fuse clips 50 that embrace the end caps 36.

Further modifications will occur to those skilled in the art, and all such are considered to fall within the spirit and scope of the present invention as defined in the appended claims.

What is claimed is:

1. A microscope flash-photography system having, in combination, a microscope provided with means for mounting a sub-stage assembly at the region of the microscope lens aperture and a camera assembly at the microscope ocular region, a flash-producing apparatus comprising a flash tube having a light-transparent envelope containing a pair of spaced electrodes extending substantially completely across the cross-section of the envelope, the space between the electrodes being filled with gas at high pressure, and the said space being of length ranging from substantially the electrode cross-dimension to several times the same, the said space defining a predetermined area bounded by the electrodes and the envelope walls therebetween in which is produced a gaseous discharge of uniform high intensity throughout, the field of view at the microscope specimen region having an area corresponding substantially to the said predetermined area, and an optical system for directing the light from the flash tube to produce an image having the said predetermined area for illuminating the said field of view uniformly throughout the same.

2. A microscope flash-photography system having, in combination, a microscope provided with means for mounting a sub-stage assembly at the region of the microscope lens aperture and a camera assembly at the microscope ocular region, a flash-producing apparatus comprising a flash tube having a light-transparent envelope containing a pair of spaced solid electrodes of cross-dimension over a substantial length thereof substantially the same as the inner cross-dimension of the envelope in the region of and in the space between the electrodes, the said space being filled with gas at high pressure and the tube being provided at its ends beyond the electrodes with expansion chambers, the said space defining a predetermined area bounded by the electrodes and the envelope walls therebetween in which is produced a gaseous discharge of uniform high intensity throughout, the field of view at the microscope specimen region having an area corresponding substantially to the said predetermined area, and an optical system for directing the light from the flash tube to produce an image having the said predetermined area for illuminating the said field of view uniformly throughout the same.

References Cited in the file of this patent

UNITED STATES PATENTS

| | | |
|---|---|---|
| 1,630,233 | Buttolph | May 24, 1927 |
| 1,927,474 | Trucksess | Sept. 19, 1933 |
| 2,077,792 | Heine | Apr. 20, 1937 |
| 2,077,809 | Riepert | Apr. 20, 1937 |
| 2,134,439 | Dorgelo | Oct. 25, 1938 |
| 2,190,294 | Mili | Feb. 13, 1940 |
| 2,234,987 | Soller | Mar. 18, 1941 |
| 2,391,611 | Back | Dec. 25, 1945 |
| 2,456,854 | Arnott et al. | Dec. 21, 1948 |
| 2,459,579 | Noel | Jan. 18, 1949 |
| 2,467,687 | Noel | Apr. 19, 1949 |
| 2,477,396 | Weiskopf | July 26, 1949 |
| 2,508,118 | Lemmers | May 16, 1950 |
| 2,542,311 | Carlson | Feb. 20, 1951 |
| 2,567,491 | Mitchell | Sept. 11, 1951 |
| 2,587,956 | Bastien | Mar. 4, 1952 |
| 2,588,368 | Edgerton | Mar. 11, 1952 |
| 2,651,969 | Thor | Sept. 15, 1953 |
| 2,654,043 | Freeman et al. | Sept. 29, 1953 |
| 2,659,268 | Grand | Nov. 17, 1953 |
| 2,691,918 | Robins et al. | Oct. 19, 1954 |
| 2,739,228 | Robins | Mar. 20, 1956 |
| 2,774,013 | Willoughby | Dec. 11, 1956 |

FOREIGN PATENTS

| | | |
|---|---|---|
| 687,195 | Great Britain | Feb. 11, 1953 |